July 25, 1961  P. W. CRAPUCHETTES  2,993,271
METHOD OF PRODUCING COPPER COATED METAL SHEET STOCK
Original Filed Aug. 12, 1953  2 Sheets-Sheet 1
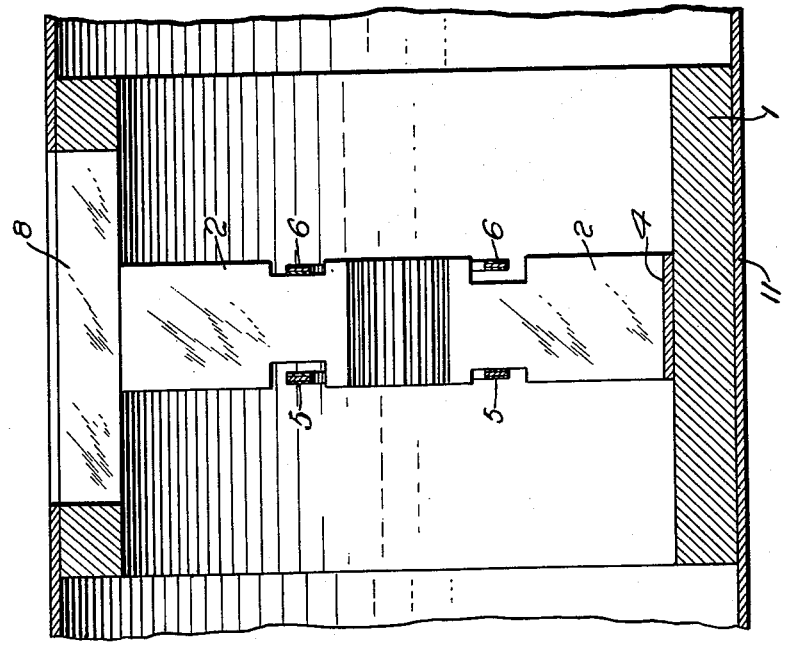
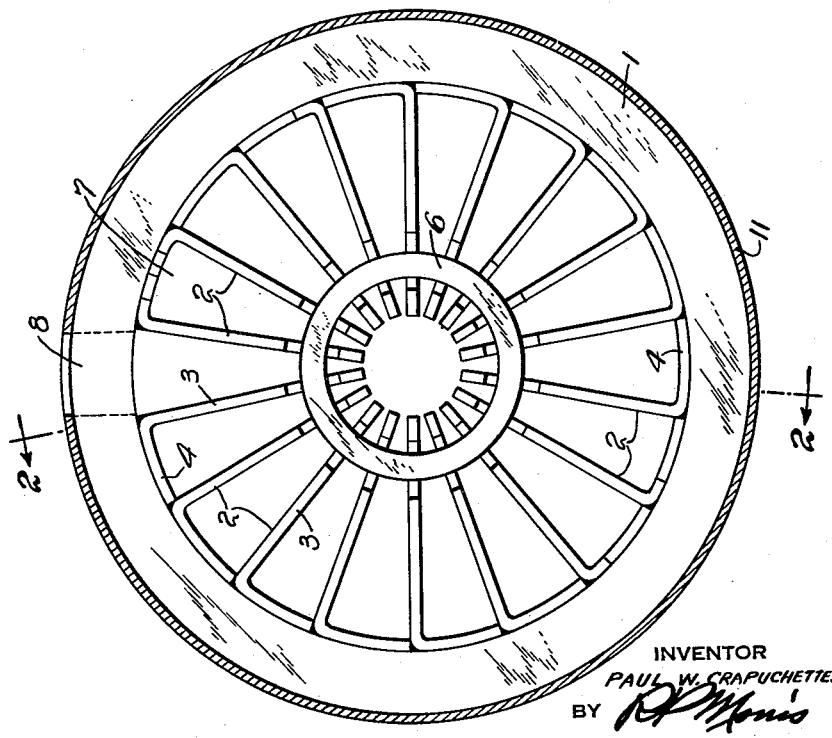
INVENTOR
PAUL W. CRAPUCHETTES
BY
ATTORNEY July 25, 1961 P. W. CRAPUCHETTES 2,993,271
METHOD OF PRODUCING COPPER COATED METAL SHEET STOCK
Original Filed Aug. 12, 1953 2 Sheets—Sheet 2

INVENTOR
PAUL W. CRAPUCHETTES
BY
ATTORNEY

United States Patent Office 2,993,271
Patented July 25, 1961

2,993,271
METHOD OF PRODUCING COPPER COATED METAL SHEET STOCK
Paul W. Crapuchettes, Palo Alto, Calif., assignor to Litton Industries, Inc., San Carlos, Calif., a corporation of Delaware
Original application Aug. 12, 1953, Ser. No. 373,761. Divided and this application Jan. 22, 1957, Ser. No. 635,535
4 Claims. (Cl. 29—492)

This invention relates to a method of producing copper coated metal and the product of this method and is a division of application Serial No. 373,761, filed August 12, 1953, now Patent 2,852,720.

The operating frequency of a magnetron varies considerably under varying ambient temperatures and different energy input conditions due to the thermal expansion and contraction of the frequency determining elements. These variations occur during operation, even in the absence of permanent deformation of the structure and are correlated with the expansion characteristics of the various constituent materials. However, heretofore, the use of low expansion metals has not been possible in magnetron anode construction because of bimetallic expansion effects caused at the juncture of these materials with the other portions of the structure. Such bi-metallic effects may result from different coefficients of thermal expansion of the materials and may result in actual rupture of certain of the connections.

A suitable stock for producing a copper clad low thermal expansion metal for use in magnetron vanes or for other low thermal expansion uses where good conductivity is desired, may be tungsten or molybdenum sheet which is first coated with a nickel coating by a suitable process, after which the copper cladding is secured to the nickel coated surface. Applicant has found that the particular method of cladding tungsten or molybdenum set forth herein produces material suitable for use in magnetron structures and capable of withstanding the rigorous and wide temperature variations to which it is subjected without appreciable damage to the magnetron itself.

The above-mentioned and other features and objects of this invention and the manner of attaining them will become more apparent and the invention itself will be best understood by reference to the following description taken in conjunction with the accompanying drawings, in which:

FIGURE 1 is an end view of a magnetron anode assembly incorporating the features of this invention;

FIGURE 2 is a sectional view of the anode assembly of FIG. 1 taken along the line 2—2 of FIG. 1;

Figure 3:
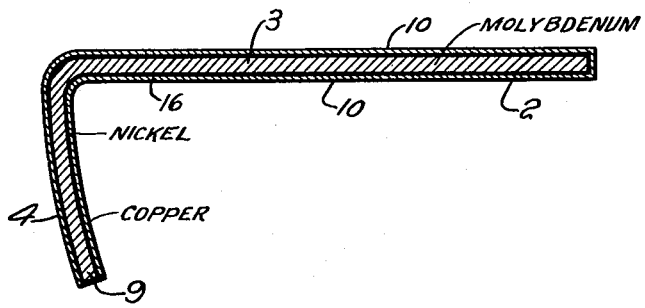
FIGURE 3 is a detailed drawing illustrating in sectional view of one of the vanes of FIG. 1.

Turning now to the drawing, the main anode body ring is shown at 1. Mounted within this ring is a plurality of radial vane elements 2. Each of these radial vane elements 2 has a radial part 3 and circumferential part 4. The vane elements are arranged to extend radially from a point near the center of the circle defined by the circumferential portions 4. The circumferential parts 4 are arranged in contact with the outer ends of the outer radial parts 3, so that the contiguous circumferential parts substantially define a circle having a radius substantially the same as the inner radius of ring 1. The portions then of the successive vanes 2 which are in contact are brazed together and brazed or otherwise suitably secured to body portion ring 1. The L-shaped vane members are so constructed as to be substantially similar except that in alternate ones of the vanes the notches for the strapping rings 5 and 6 are on opposite sides of the vanes at different depths as can be clearly seen in FIG. 2. Furthermore two of these vanes 2 are made somewhat different in order to terminate one of the resonators, as indicated at 7. These two vanes each have the L-portions made one half the normal circumferential range of the sector shaped resonators so that they may be placed together at the single center point. Also, the output resonator 8 may be defined by the first and last elements 2 without requiring an additional vane therefor. Preferably an opening is provided as indicated at 8 in anode ring 1, for output coupling to an output wave guide or the like.

Each of the vane elements as shown in FIG. 3 is comprised of a center portion 9 made of low thermal expansion material such as molybdenum or tungsten and is coated on its outer surfaces with a high conductivity metal as indicated at 10, such as copper. Preferably also the inner surface of anode ring 1 is coated with copper in order to form a desirable surface for the brazing in position of the various vane elements. In constructing this assembly the vane elements are all assembled in a suitable jig. The brazing compound is then applied at the contacting edges of the vanes 2 and the assembly is heated to braze these parts together. Strapping rings 5 and 6 are then applied and brazed to the alternate vane elements 2. The anode ring 1 may then be supported in a suitable jig and the circular vane assembly brazed to the inner surface thereof. A copper tube 11, preferably relatively thin, may be secured to the outer periphery of ring 1 for mounting the anode assembly and connecting it to the other portions of the magnetron tube. For simplicity of illustration the remaining structure of the magnetron has been omitted.

Figure 4:
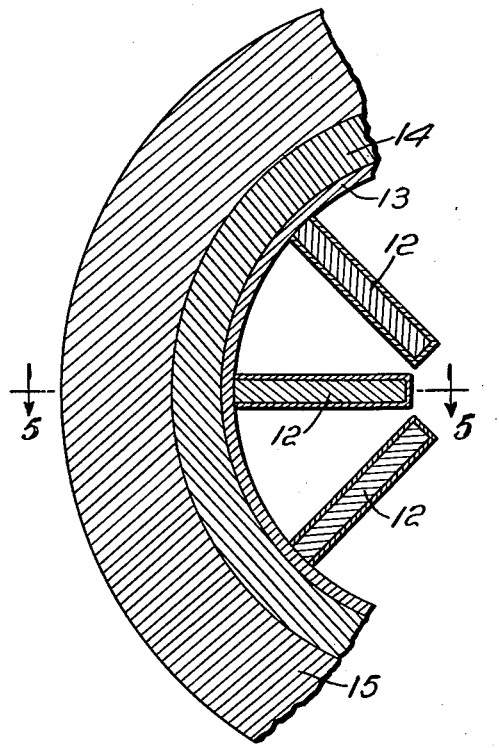
FIGURE 4 is a diagrammatic illustration of an alternative magnetron construction in accordance with the principles of this invention.
Figure 5:
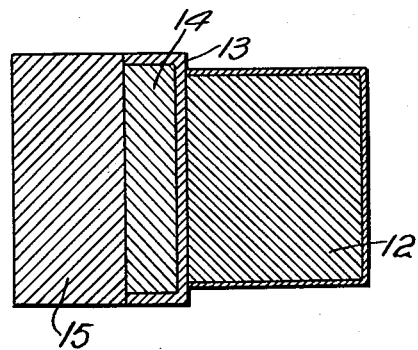
FIGURE 5 is a sectional view of FIG. 4 taken along the line 5—5 of that figure.

While the L-shaped anode assembly illustrated in FIGS. 1-3 is preferred, a modified form of anode resonator assembly in accordance with the principles of this invention may be constructed in the manner shown in FIGS. 4 and 5. In this arrangement the anode vanes 12 are shown as straight elements of copper clad molybdenum stock which may be brazed to the copper lining 13 of a molybdenum body ring 14. If desired a copper body cylinder may be provided for connecting the anode assembly to other portions of the tube. It will be realized that the illustration particularly in FIGS. 4 and 5 is simply diagrammatic and does not indicate the relative thickness of the various metals used, nor the proper relative dimensions thereof.

In an actual magnetron made to operate in a range of 9000 megacycles and constructed substantially in accordance with the illustration shown in FIGS. 1, 2 and 3, remarkable frequency stability was achieved over a relatively wide temperature variation. In fact, when the temperature was varied 110° C. the frequency shift of only 2.1 megacycles per second was noted, whereas in the conventional magnetron at the same frequency range made entirely of copper, a frequency shift of about 20 megacycles per second occurs for the same temperature change.

Considerable experimentation was found necessary in order to obtain a suitable covered molybdenum or tungsten stock which would achieve the necessary stability within the temperature operating range of the magnetron. Ordinary copper plating on molybdenum was found to separate and blister under operating conditions and so ruin the tube for proper operation. A method for producing stock for construction of the magnetron is as follows:

The molybdenum or tungsten is first cleaned chemically in the usual manner, the base stock material is then flashed with nickel in a low pH solution containing chlorine and fluorine negative ions. The flashed stock is then plated with nickel to a thickness of approximately .0002 inch after which the plated stock is heated to flow the nickel on the stock metal in an inert hydrogen atmosphere at a temperature of approximately 1350° C. just long enough completely to flow the nickel. To this nickel clad stock material the copper may be applied in a number of different ways.

One method of applying the copper is to flash the coated metal with copper and plate this flashed material to a thickness of approximately .0002 inch with copper, after which the assembly is heated sufficiently to melt the copper into the nickel. This is then replated with copper to the desired thickness. This thickness may be made sufficient to take care of machining or polishing, if this is desired.

Another method is simply to braze the copper sheet to the nickel clad material with suitable solders.

A third method consists in rolling a sheet of copper onto the nickel clad material and reducing the sheet of copper in thickness, the pressure of rolling being sufficient to produce a cold welding of the copper to the nickel at the bond. This cold welded stock is then heated in an inert atmosphere, such as hydrogen, to a temperature to produce a sintering condition of the copper and the nickel.

It is clear that instead of copper, silver or gold can be used as a low conductive material if desired.

While I have described above the principles of my invention in connection with specific apparatus, it is to be clearly understood that this description is made only by way example and not as a limitation to the scope of my invention, as set forth in the objects thereof and in the accompanying claims.

What is claimed is:

1. A process of preparing a copper coated metal sheet stock from a metal having a relatively low coefficient of thermal expansion selected from the group consisting of molybdenum and tungsten, which comprises, flashing the stock with nickel in a Cl$^-$ and F$^-$ solution at a low pH, plating the flashed stock with nickel to a thickness of substantially .0002 inch, heating said nickel plated stock to a temperature of approximately 1350° C. for a period just sufficient to completely flow the nickel and thereafter forming a continuous conductive bond between a copper coating and the nickel surface over substantially the whole surface.

2. A process according to claim 1, wherein said last step comprises flashing the surface of said nickel with copper, plating the copper flashed surface with copper to a thickness in the order of .0002 inch, heating the copper plated stocks at a temperature sufficient to melt the copper and nickel and thereafter plating the coated stock with copper to the desired thickness.

3. A process according to claim 1, wherein said last step comprises, brazing a copper sheet to said nickel clad stock material.

4. A process according to claim 1, wherein said last named step comprises cold rolling a sheet of copper onto the nickel clad stock to reduce the thickness enough to produce a cold welding, and heating the cold welded material in an inert atmosphere to sintering temperature of the copper and nickel.

References Cited in the file of this patent

UNITED STATES PATENTS

| | | |
|---|---|---|
| 1,582,024 | Bagley | Apr. 27, 1926 |
| 1,614,501 | Stoekle | Jan. 18, 1927 |
| 2,024,150 | Davignon | Dec. 17, 1935 |
| 2,221,562 | Wernlund | Nov. 12, 1940 |
| 2,338,529 | Mougey et al. | Jan. 4, 1944 |
| 2,427,727 | Huntley et al. | Sept. 23, 1947 |
| 2,429,222 | Ehrhardt et al. | Oct. 21, 1947 |
| 2,621,303 | Law | Dec. 9, 1952 |
| 2,641,440 | Williams | June 9, 1953 |
| 2,691,815 | Boessenkool et al. | Oct. 19, 1954 |
| 2,748,067 | Pease et al. | May 29, 1956 |
| 2,779,999 | Boam et al. | Feb. 5, 1957 |

FOREIGN PATENTS

| | | |
|---|---|---|
| 520,365 | Great Britain | Apr. 22, 1940 |
| 475,925 | Canada | Aug. 7, 1951 |